United States Patent
Gaertner et al.

(10) Patent No.: US 7,308,373 B2
(45) Date of Patent: Dec. 11, 2007

(54) METHOD FOR DETERMINING A VEHICLE REFERENCE VELOCITY

(75) Inventors: Volker Gaertner, Clausthal-Zellerfeld (DE); Volker Wehren, Wolfsburg (DE); Helge Dittrich, Braunschweig (DE); Rainer Rinck, Hersbruck (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 10/535,785

(22) PCT Filed: Nov. 14, 2003

(86) PCT No.: PCT/EP03/12723

§ 371 (c)(1),
(2), (4) Date: Sep. 26, 2005

(87) PCT Pub. No.: WO2004/048170

PCT Pub. Date: Jun. 10, 2004

(65) Prior Publication Data

US 2006/0129343 A1    Jun. 15, 2006

(30) Foreign Application Priority Data

Nov. 22, 2002 (DE) ............................... 102 54 628

(51) Int. Cl.
*G01P 21/00* (2006.01)
(52) U.S. Cl. .............. 702/96; 702/142; 702/145; 702/147; 701/70; 701/74; 701/79
(58) Field of Classification Search ............ 702/96; 701/70, 74, 79
See application file for complete search history.

(56) References Cited

U.S. PATENT DOCUMENTS

| | | | | |
|---|---|---|---|---|
| 4,538,230 A * | 8/1985 | Reust et al. | .................... | 701/8 |
| 4,984,161 A * | 1/1991 | Nakazawa et al. | ............ | 701/55 |
| 5,058,019 A | 10/1991 | Litkouhi | ...................... | 701/74 |
| 5,644,490 A | 7/1997 | Weber | .......................... | 701/74 |
| 5,719,770 A * | 2/1998 | Matsuno | ...................... | 701/71 |
| 2004/0000191 A1* | 1/2004 | Ben-David | ................. | 73/118.1 |

FOREIGN PATENT DOCUMENTS

| | | |
|---|---|---|
| DE | 41 04 775 | 8/1992 |
| DE | 689 08 007 | 12/1993 |
| DE | 195 27 531 | 2/1996 |
| DE | 197 35 562 | 2/1999 |
| EP | 0 322 911 | 7/1989 |
| EP | 0 342 789 | 11/1989 |

* cited by examiner

*Primary Examiner*—Hal Wachsman
*Assistant Examiner*—Janet Suglo
(74) *Attorney, Agent, or Firm*—W. F. Fasse; W. G. Fasse

(57) ABSTRACT

A velocity and acceleration are measured (14) in a method for determining a vehicle reference velocity, said vehicle reference velocity being used for determining and selecting a suitable transmission ratio. If a measured acceleration ($a_{ist}$) exceeds (16) a maximally possible acceleration ($a_{max}$), a vehicle reference acceleration ($a_{ref}$) is determined depending on said exceeding. For this purpose, an acceleration correction value (BKF) is calculated (22) by means of which acceleration correction value a vehicle reference acceleration is calculated (24). The vehicle reference velocity ($v_{ref}$) is determined (26) by means of the vehicle reference acceleration ($a_{ref}$). A gearbox transmission ratio is determined (20) by means of the determined vehicle reference velocity. This branch of the procedure represents the case in which at least one wheel equipped with sensors slips.

8 Claims, 1 Drawing Sheet

METHOD FOR DETERMINING A VEHICLE REFERENCE VELOCITY

FIELD OF THE INVENTION

The invention relates to a method for determining a vehicle reference velocity of a motor vehicle, said reference velocity being used for selecting a suitable transmission ratio of a gearbox of the motor vehicle.

BACKGROUND INFORMATION

When automatically selecting a gearbox transmission ratio, the velocity of the vehicle over the ground is to be taken into consideration. For this purpose, sensors for measuring the velocity or the acceleration are attached to one or more wheels of the vehicle. A velocity measured directly or determined by integrating a measured acceleration and, in the event that sensors are attached to several wheels, representing a mean velocity is used as a vehicle reference velocity for selecting the transmission ratio of a gearbox. In the event of slip of at least one wheel, the prior-art methods do not provide a suitable vehicle reference velocity for selecting the transmission ratio of the gearbox any more.

Wheel slip is also taken into consideration with antilock braking control systems. Such systems use various mathematical manipulations for estimating the velocity of a vehicle for comparison with the rotational velocity of a given vehicle wheel for calculating a wheel slip of this wheel, wherein the wheel slip is a parameter. DE-T2 689 08 007 describes a method for estimating a reference velocity or reference acceleration by periodic extrapolation. However, this method does not provide a suitable vehicle reference velocity for selecting the transmission ratio of the gearbox.

SUMMARY OF THE INVENTION INVENTION

It is therefore the object of the invention to provide a method for determining a vehicle reference velocity of a motor vehicle so that in the event of wheel slip, even with simultaneous macro slip of all wheels, a vehicle reference velocity is provided that can be used for selecting a suitable transmission ratio of a gearbox of the motor vehicle.

This object is achieved according to the invention as disclosed and claimed herein.

The invention relates to a method for selecting a suitable gearbox transmission ratio in which a vehicle reference velocity ($v_{ref}$) is determined by comparing the actual acceleration with a maximally possible acceleration ($a_{max}$). For this purpose, a velocity and acceleration are measured, wherein the velocity may be measured by means of acceleration sensors and integrating measured acceleration data over the time.

The next step is a check whether the measured acceleration ($a_{ist}$) exceeds the maximally possible acceleration ($a_{max}$). The maximally possible acceleration ($a_{max}$) is preferably determined on the assumption that the real friction between the wheel and the road is on its highest possible level.

If the measured acceleration ($a_{ist}$) does not exceed the maximally possible acceleration ($a_{max}$), the vehicle reference velocity ($v_{ref}$) is determined by using the measured values.

If the measured acceleration ($a_{ist}$) exceeds the maximally possible acceleration ($a_{max}$), a vehicle reference acceleration ($a_{ref}$) is determined depending on the extent to which the measured acceleration ($a_{ist}$) exceeds the maximally possible acceleration ($a_{max}$), wherein the vehicle reference velocity ($v_{ref}$) is determined by means of the vehicle reference acceleration ($a_{ref}$).

The vehicle reference acceleration ($a_{ref}$) is preferably determined by means of an acceleration correction value (BKF). This acceleration correction value (BKF) is advantageously calculated by BKF=($a_{ist}$−$a_{max}$) / ($a_{top}$−$a_{max}$), wherein $a_{top}$ is a maximal vehicle-specific acceleration determined on the assumption that the friction between the wheel and the road is on its lowest possible level.

Thus, the vehicle reference acceleration is preferably calculated by $a_{ref}$=(1−BKF)*($a_{max}$−$a_{min}$)+$a_{min}$, wherein $a_{min}$ is a minimal vehicle-specific acceleration determined on the assumption that the friction between the wheel and the road is infinite.

The vehicle reference velocity ($v_{ref}$) is preferably determined by integrating the vehicle reference acceleration ($a_{ref}$) over the time.

According to a further advantageous realization of the invention, the procedure is repeated while the vehicle is moving.

The vehicle reference velocity ($v_{ref}$) is preferably used for determining a gearbox transmission ratio.

A motor vehicle according to the present invention has an automatic transmission controlled by the method for determining a vehicle reference velocity ($v_{ref}$) and particularly has an appropriately configured control device/automatic control device.

BRIEF DESCRIPTION OF THE DRAWINGS

Further advantages and details of the invention are set forth in the following description of preferred exemplary embodiments on the basis of the drawing.

DETAILED DESCRIPTION OF AN EXAMPLE EMBODIMENT OF THE INVENTION

Figure 1:
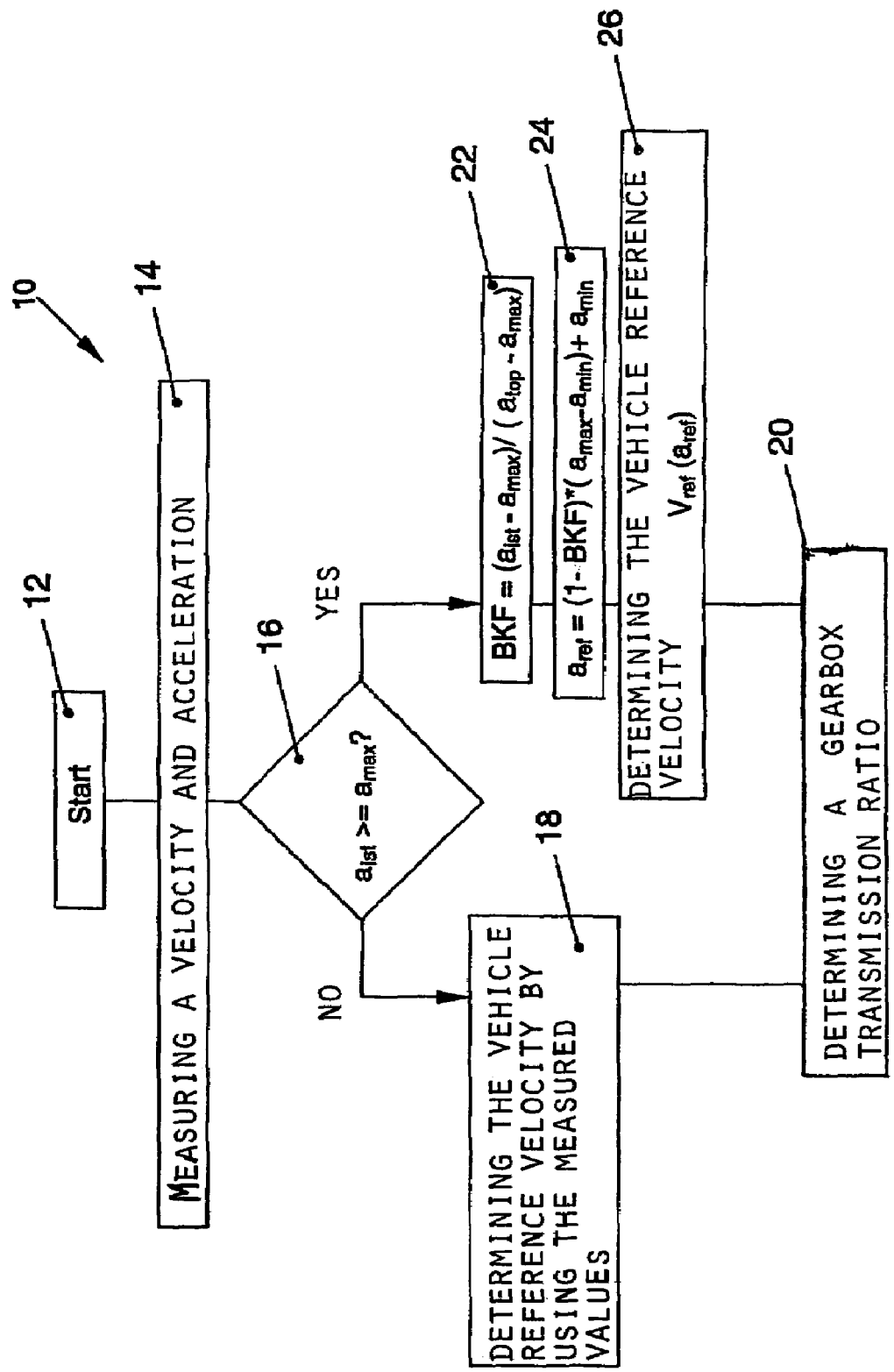
FIG. 1 shows a flow chart of a method according to the invention.

In FIG. 1, the flow chart 10 shows a method for determining a vehicle reference velocity according to the invention.

The procedure starts in step 12 that is followed by step 14 where a velocity and acceleration are measured. Step 16 is a check whether the measured acceleration ($a_{ist}$) exceeds a maximally possible acceleration ($a_{max}$).

If the measured acceleration ($a_{ist}$) does not exceed the maximally possible acceleration ($a_{max}$)($a_{ist}$<$a_{max}$), the vehicle reference velocity is determined in step 18 by using the measured values. A gearbox transmission ratio is determined in step 20 by means of the determined vehicle reference velocity. This branch of the procedure represents the case in which no wheel, or at least no wheel equipped with sensors, slips.

If the measured acceleration ($a_{ist}$) exceeds the maximally possible acceleration ($a_{max}$) in step 16 ($a_{ist}$>=$a_{max}$), an acceleration correction value (BKF) is calculated in step 22 by BKF=($a_{ist}$−$a_{max}$)/($a_{top}$−$a_{max}$), wherein $a_{top}$ is a maximal vehicle-specific acceleration determined on the assumption that the friction between the wheel and the road is on its lowest possible level. By means of said acceleration correction value BKF, a vehicle reference acceleration is calculated in step 24 by $a_{ref}$=(1−BKF*($a_{max}$−$a_{min}$)+$a_{min}$, wherein $a_{min}$ is a minimal vehicle-specific acceleration determined on the assumption that the friction between the wheel and the road is infinite.

The vehicle reference velocity ($v_{ref}$) is determined in step 26 by means of the vehicle reference acceleration ($a_{ref}$) and preferably by integrating the vehicle reference acceleration ($a_{ref}$) over the time. A gearbox transmission ratio is determined in step 20 by means of the determined vehicle reference velocity. That branch of the procedure represents the case in which at least one wheel equipped with sensors slips.

Moreover, the procedure is preferably repeated while the vehicle is moving. In this manner, a correct gearbox transmission ratio can continuously be determined while the vehicle is moving.

LIST OF REFERENCE NUMERALS

10 flow chart
12 start
14 measuring a velocity and acceleration
16 $a_{ist} \geq a_{max}$?
18 determining the vehicle reference velocity by using the measured values
20 determining a gearbox transmission ratio
22 BKF=$(a_{ist}-a_{max})/(a_{top}-a_{max})$
24 $a_{ref}=(1-BKF)*(a_{max}-a_{min})+a_{min}$
26 determining the vehicle reference velocity $v_{ref}$ ($a_{ref}$)

The invention claimed is:

1. A method of determining a vehicle reference velocity ($V_{ref}$) of a motor vehicle that includes a vehicle wheel and that drives along a travel surface with friction between said vehicle wheel and said travel surface, said method comprising the steps:
    a) providing a maximally possible acceleration ($a_{max}$);
    b) determining (14) a measured velocity and a measured acceleration ($a_{ist}$) of said vehicle;
    c) checking (16) whether said measured acceleration ($a_{ist}$) exceeds said maximally possible acceleration ($a_{max}$);
    d) if said measured acceleration ($a_{ist}$) does not exceed said maximally possible acceleration ($a_{max}$), then determining (18) said vehicle reference velocity ($V_{ref}$) as being said measured velocity; and
    e) if said measured acceleration ($a_{ist}$) exceeds said maximally possible acceleration ($a_{max}$), then determining (24) a vehicle reference acceleration ($a_{ref}$) as:

$$a_{ref}=(1-BKF)*(a_{max}-a_{min})+a_{min}$$

wherein:
        BKF =$(a_{ist}-a_{max})/(a_{top}-a_{max})$,
        $a_{ref}$ is said vehicle reference acceleration,
        $a_{max}$ is said maximally possible acceleration,
        $a_{min}$ is a minimal vehicle-specific acceleration based on said friction being infinite,
        $a_{ist}$ is said measured acceleration,
        $a_{top}$ is a maximal vehicle-specific acceleration based on said friction being at a lowest possible friction value,
    and determining (26) said vehicle reference velocity ($V_{ref}$) by integrating said vehicle reference acceleration ($a_{ref}$) over time.

2. The method according to claim 1, further comprising controlling a system of said motor vehicle dependent on and responsive to said vehicle reference velocity ($V_{ref}$).

3. The method according to claim 1, further comprising controlling a drive train of said motor vehicle dependent on and responsive to said vehicle reference velocity ($V_{ref}$).

4. The method according to claim 1, further comprising determining and selecting a transmission ratio of a transmission of said vehicle dependent on and responsive to said vehicle reference velocity ($V_{ref}$).

5. The method according to claim 1, wherein said step of determining said measured velocity comprises measuring said measured acceleration and integrating said measured acceleration over time to provide said measured velocity.

6. The method according to claim 1, wherein said step of providing said maximally possible acceleration ($a_{max}$) comprises specifying said maximally possible acceleration ($a_{max}$) for a condition that said friction is at a highest possible friction value.

7. The method according to claim 1, further comprising repeating said steps b), c), d) and e) while said vehicle drives along said travel surface.

8. A motor vehicle comprising:
    a vehicle wheel adapted to rotate along a travel surface with friction between said vehicle wheel and said travel surface as said vehicle travels over said travel surface;
    an automatic transmission;
    means for measuring a measured velocity and a measured acceleration of said vehicle;
    means for checking whether the measured acceleration exceeds a maximally possible acceleration;
    means for determining a vehicle reference acceleration ($a_{ref}$) as:

$$a_{ref}=(1-BKF)*(a_{max}-a_{min})+a_{min}$$

wherein:
        BKF=$(a_{ist}-a_{max})/(a_{top}-a_{max})$,
        $a_{ref}$ is said vehicle reference acceleration,
        $a_{max}$ is said maximally possible acceleration,
        $a_{min}$ is a minimal vehicle-specific acceleration based on said friction being infinite,
        $a_{ist}$ is said measured acceleration,
        $a_{top}$ is a maximal vehicle-specific acceleration based on said friction being at a lowest possible friction value,
    if the measured acceleration exceeds the maximally possible acceleration;
    means for determining the vehicle reference velocity as being the measured velocity if the measured acceleration does not exceed the maximally possible acceleration, and for determining the vehicle reference velocity by integrating the vehicle reference acceleration over time if the measured acceleration exceeds the maximally possible acceleration; and
    means for controlling the automatic transmission dependent on and responsive to the vehicle reference velocity.

* * * * *